US012333002B2

(12) United States Patent
Liu

(10) Patent No.: US 12,333,002 B2
(45) Date of Patent: Jun. 17, 2025

(54) SECURE OPERATING SYSTEM UPDATE

(71) Applicant: Micron Technology, Inc., Boise, ID (US)

(72) Inventor: Zhan Liu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 457 days.

(21) Appl. No.: 17/717,954

(22) Filed: Apr. 11, 2022

(65) Prior Publication Data

US 2023/0325507 A1  Oct. 12, 2023

(51) Int. Cl.
*G06F 12/14* (2006.01)
*G06F 21/51* (2013.01)
*G06F 21/55* (2013.01)
*G06F 21/57* (2013.01)
*G06F 21/78* (2013.01)

(52) U.S. Cl.
CPC ............ *G06F 21/554* (2013.01); *G06F 21/51* (2013.01); *G06F 21/57* (2013.01); *G06F 21/78* (2013.01)

(58) Field of Classification Search
CPC ........ G06F 21/554; G06F 21/51; G06F 21/57; G06F 21/78
See application file for complete search history.

(56) References Cited

U.S. PATENT DOCUMENTS

| 2014/0025940 | A1* | 1/2014 | Giraud ............... G06F 21/51 713/2 |
| 2015/0334114 | A1* | 11/2015 | Scarlata .............. G06F 21/81 713/170 |
| 2016/0232343 | A1* | 8/2016 | Post ..................... G06F 21/44 |
| 2020/0167294 | A1* | 5/2020 | Dewan ............ G06F 12/1416 |
| 2022/0237296 | A1* | 7/2022 | Kelly .................. G06F 21/57 |

FOREIGN PATENT DOCUMENTS

| CN | 106663063 A | * | 5/2017 | ............ G06F 12/14 |
| CN | 108366069 A | * | 8/2018 | ........... H04L 63/083 |

* cited by examiner

*Primary Examiner* — Joseph P Hirl
*Assistant Examiner* — Aayush Aryal
(74) *Attorney, Agent, or Firm* — Holland & Hart LLP

(57) ABSTRACT

Methods, systems, and devices for secure operating system update are described. A first message including a first value and a request associated with an operating system that is stored in a write-protected area of memory may be transmitted to a server. In response to the first message, a second message including data associated with the operating system, a second value corresponding to the first value, and a signature of the server may be received. The data associated with the operating system may be validated based on the signature of the server and a comparison of the second value and the first value. Based on validating the data associated with the operating system, the data associated with the operating system may be written to the write-protected area of memory.

25 Claims, 7 Drawing Sheets

SECURE OPERATING SYSTEM UPDATE

FIELD OF TECHNOLOGY

The following relates to one or more systems for memory, including secure operating system update.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Code for applications installed on a device (e.g., a phone, computer, etc.) may be run by a host system and stored in a memory system. Code for certain applications (e.g. applications that are essential to the functioning of a device including the host system and memory system, such as an operating system) may be stored in a write-protected area of the memory system, where the host system may be prevented from altering code for applications that is stored in the write-protected area of the memory system. That is, application code that is stored in the write-protected area may be read-only for the host system or other applications.

In some examples, application code stored in the write-protected area of the memory system may be read-only based on whether the device is in an operating mode or a recovery mode. For example, the host system may be permitted to write to or read from the write-protected area while the device is in a recovery mode. In some examples, the host system may be permitted to update an operating system stored in the write-protected area while the device is in the recovery mode. However, while in the recovery mode, certain functionalities of the device may be unavailable— e.g., user applications may be inaccessible while the device is in the recovery mode.

To protect application code from being unintentionally or maliciously modified during device operation while also enabling the application code to be updated while a device is in an operating mode, a security-elevated write command may be used to write to a write-protected area of memory while the device is in an operating mode. The security-elevated write command may be associated with a unique command code—e.g., that distinguishes the security-elevate write command from a standard write command. Also, the security-elevated write command may be generated based on a unique value generated by the device storing the application code. After receiving a security-elevated write command, a device may determine whether to enable a write operation to a write-protected area of memory based on the unique value generated by the device and verifying a signature of an origination point of the security-elevated write command.

Features of the disclosure are initially described in the context of systems, devices, and circuits. Features of the disclosure are also described in the context of a process flow. These and other features of the disclosure are further illustrated by and described in the context of apparatus diagrams and flowcharts that relate to secure operating system update.

Figure 1:
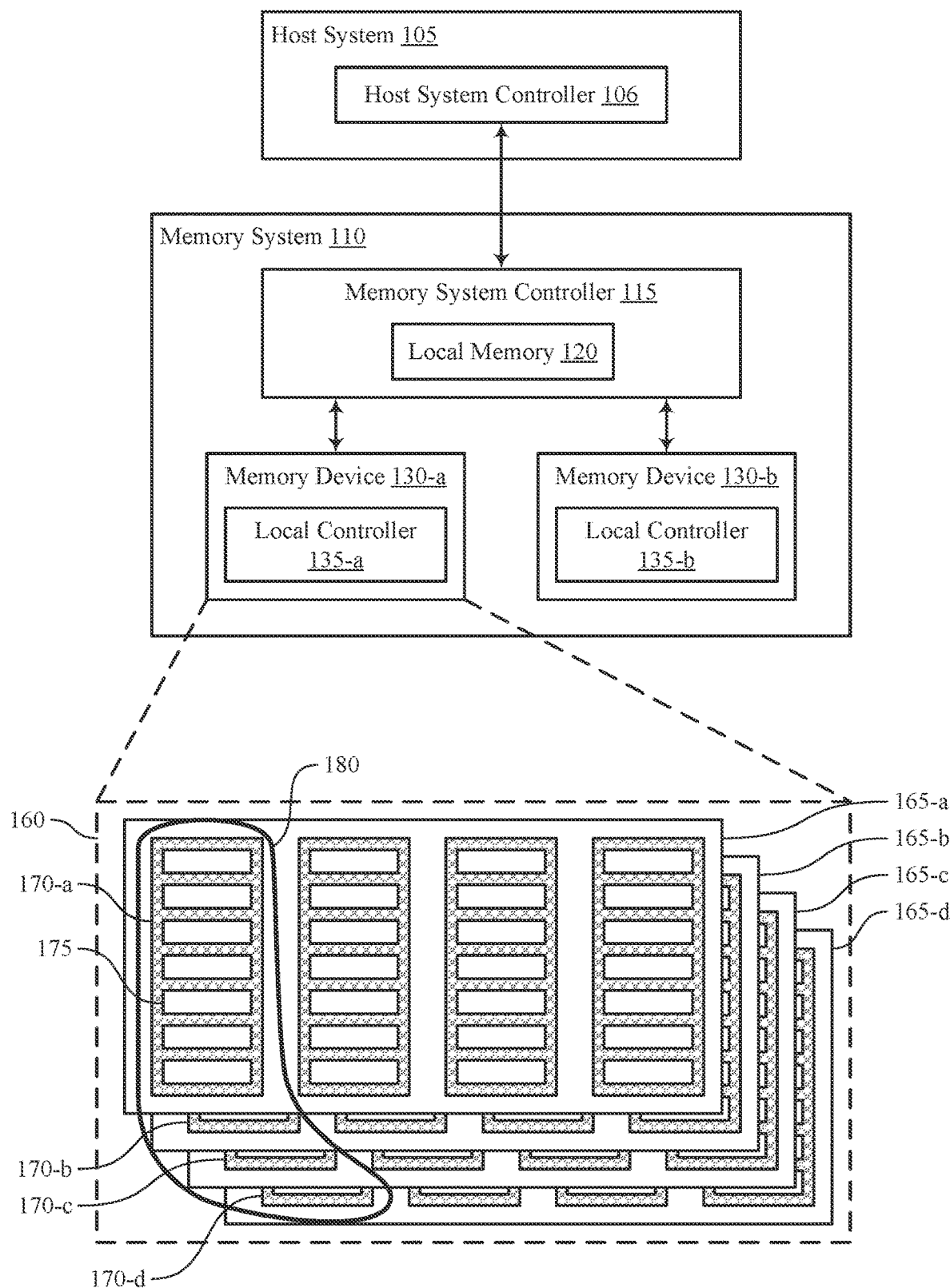
FIG. 1 illustrates an example of a system that supports secure operating system update in accordance with examples as disclosed herein.

FIG. 1 illustrates an example of a system 100 that supports secure operating system update in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support secure operating system update. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Code for applications run by the host system 105 may be stored in the memory system 110. Code for certain applications (e.g. applications that are essential to the functioning of the system 100, such as an operating system) may be stored in a write-protected area of the memory system 110. A write-protected area may be an example of an area of the memory system 110 where the host system 105 may be prevented from altering code for applications that is stored in the write-protected area of the memory system 110. That is, application code that is stored in the write-protected area may be read-only for the host system 105. In some examples, the write-protected area of the memory system 110 corresponds to a portion of the memory device 130-a. In some examples, the write-protected area of the memory system 110 corresponds to a full memory device (e.g., the memory device 130-b).

In some examples, application code stored in the write-protected area of the memory system 110 may be read-only based on whether the system 100 is in an operating mode or a recovery mode. For example, the host system 105 may be permitted to write to or read from the write-protected area while the system 100 is in a recovery mode. In some examples, the host system 105 may be permitted to update an operating system stored in the write-protected area while the system 100 is in the recovery mode. However, while in the recovery mode, certain functionalities of the system 100 may be unavailable—e.g., user applications may be inaccessible while the system 100 is in the recovery mode.

To protect important application code from being unintentionally or maliciously modified during device operation while also enabling the application code to be updated while a device (e.g., including the system 100) is in an operating mode, a security-elevated write command may be used to write to a write-protected area of memory while the device is in an operating mode. The security-elevated write command may be associated with a unique command code—e.g., that distinguishes the security-elevate write command from a standard write command. Also, the security-elevated write command may be generated based on a unique value generated by the device storing the application code. After receiving a security-elevated write command, a device may determine whether to enable a write operation to a write-protected area of memory based on the unique value generated by the device and verifying a signature of an origination point of the security-elevated write command.

In some examples, the memory system 110 may store code for an operating system in a write-protected area of memory, where a security-elevated write command may be used to write to the write-protected area of memory. An operating system may be an example of software that manages operating the hardware and software resources of the system 100. Based on operating system information being identified for updates, the memory system 110 may transmit, via the host system 105, a message to a server that includes a unique value (e.g., a monotonic value or a nonce) and a request for operating system information (e.g., an update to an operating system, a same or different version of an operating system, a different operating system, etc.). The unique value may be unique in that after the unique value is used to validate a security-elevated write command, the memory system 110 may generate a new value for validating a subsequent security-elevated write command. In response to the transmitted message, the memory system 110 may receive, from the server and via the host system 105, a security-elevated write command that includes a value purporting to be the unique value, operating system information, and a signature of the server (generated using a private key of the server). Based on the server receiving the transmitting message from the memory system 110, the purported value may be equivalent to the unique value. By contrast, a purported value included in a security-elevated write command by a server (e.g., managed by a malicious actor) that generated the security-elevated write command without receiving the transmitted message may be different than the unique value.

Based on receiving the security-elevated write command, the memory system 110 may determine that the operating system data is valid by verifying that the signature is genuine and corresponds to the server (e.g., by using a public key of the server that is paired with the private key of the server). Based on validating the security-elevated write command, the memory system may write the operating system information to the write-protected area of the memory system. Writing the operating system information may include overwriting portions (or all) of an operating system stored in the write-protected area, adding portions of an operating system to the write-protected area, or writing a new operating system to the write-protected area.

By supporting a security-elevated write command, a device may confirm an authenticity of a received command and software (e.g., an operating system) may be updated while a device is in an operating mode.

Figure 2:
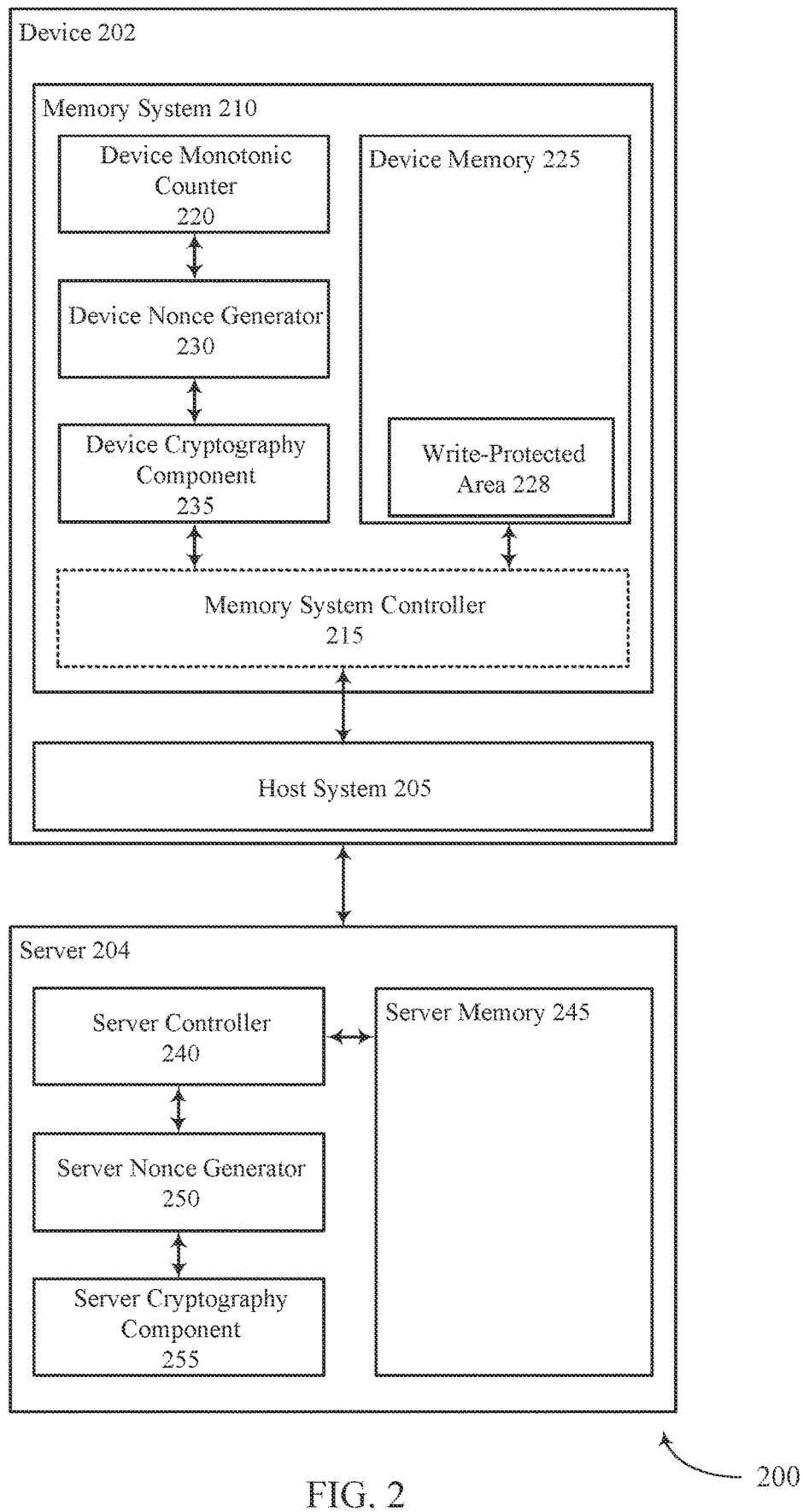
FIG. 2 illustrates an example of a system that supports secure operating system update in accordance with examples as disclosed herein.

FIG. 2 illustrates an example of a system that supports a secure operating system update in accordance with examples as disclosed herein.

The system 200 depicts a connection between the device 202 and the server 204—e.g., via a data network, such as the Internet. The device 202 may be an electronic device, such as a phone, laptop, desktop, server, etc. The device 202 may include the memory system 210 and the host system 205, which may be examples of the memory system and the host system described with reference to FIG. 1. The memory system 210 may include the device monotonic counter 220, the device nonce generator 230, the device cryptography component 235, the device memory 225, and the memory system controller 215. In some examples, the memory system 210 includes one of the device monotonic counter 220 or the device nonce generator 230.

The device monotonic counter 220 may be configured to generate monotonic values, where each subsequently generated monotonic value may be greater than a prior monotonic value. In some examples, the device monotonic counter 220 may periodically (or sporadically) generate new monotonic values. Additionally, or alternatively, the device monotonic counter 220 may be configured to generate a new monotonic value each time a security-elevated write command is received from the server 204.

The device nonce generator 230 may be configured to generate nonces. A nonce may be a random value that is used for a single transaction, such as device security. In some examples, the device nonce generator 230 may periodically (or sporadically) generate new nonces. Additionally, or alternatively, the device nonce generator 230 may be configured to generate a new random value each time a security-elevated write command is received from the server 204.

The device cryptography component 235 may be configured to determine whether a message (e.g., a write-elevated command) received from the server 204 did in fact originate from the server 204. To determine whether the message did in fact originate from the server 204, the device cryptography component 235 may verify a signature of the server 204 that is attached to the message. The device cryptography component 235 may store a public key of the server 204 that is paired with a private key of the server 204. The device cryptography component 235 may be configured to use the public key of the server 204 to confirm that the message (which is signed by the server 204 using the private key of the server 204) was sent from the server 204.

The device cryptography component 235 may further use a value of the device monotonic counter 220 or the device nonce generator 230 to determine whether a received security-elevated write command having a verifiable signature is valid. The value of the device monotonic counter 220 or the device nonce generator 230 stored at the device cryptography component 235 may be equivalent to a value of the device monotonic counter 220 or the device nonce generator 230 sent to the server 204 with a request for a software update. Based on sending the monotonic value or nonce to the server 204 (e.g., in response to a server or user-initiated update process), the device cryptography component 235 may determine whether a matching value is included in a security-elevated write command received from the server 204 received for the update process.

The memory system controller 215 may be configured to receive a security-elevated write command from the server 204. The memory system controller 215 may use the device cryptography component 235 (which may be included within the memory system controller 215, as may be the device monotonic counter 220 and the device nonce generator 230) to determine whether the security-elevate write command is valid. Based on determining that the security-elevated write command is valid, the memory system controller 215 may be configured to write to the write-protected area 228 of the device memory 225, where the write-protected area 228 may be configured to store software being updated by the security-elevated write command. In some examples, the memory system controller 215 may be omitted. In such cases, functionality of the memory system controller 215 may be incorporated into the host system 205. Similarly, functionality of the device monotonic counter 220, the device nonce generator 230, and the device cryptography component 235 may incorporated into the host system 205 instead of the memory system 210.

The device memory 225 may be configured to store information (e.g., user and system information) for device 202. The device memory 225 may be distributed across multiple memory devices, such as the memory devices 130. The device memory 225 may include areas that may be read from and written to (e.g., by the host system 205) without restriction. The device memory 225 may also include areas that may be read from and/or written to only by certain applications (e.g., with threshold privilege levels). The device memory 225 may also include areas that, while the device 202 is in an operating mode, may be written to only using security-elevated write commands.

The host system 205 may be configured to run applications—e.g., using application code stored at the device memory 225. The host system 205 may further be used for communication functions, such as establishing a connection and exchanging data with devices on a data network (such as the server 204).

The server 204 may be a computing system that stores information that is accessible via a data network. The server 204 may be configured to store operating systems and operating system updates. The server 204 may be configured with a private key that is stored at and known only to the server 204 as well as a public key that may be stored at devices, such as the device 202. The public key may be advertised and generally known. Additionally, or alternatively, the public key may be stored in devices (such as the device 202) prior to deployment of the devices. The server 204 may include the server controller 240, the server nonce generator 250, the server cryptography component 255, and the server memory 245.

The server controller 240 may be configured to communicate with devices (such as device 202). The server controller 240 may also be configured to access data stored in the server memory 245. The server controller 240 may be further configured to communicate data to devices, where the server controller 240 may be configured to sign, using a private key, the data transmissions to the devices.

The server nonce generator 250 may be configured to generate a nonce. In some examples, the server nonce generator 250 may be transmitted with data and used to generate a signature of the server 204 that is transmitted with the transmitted data.

The server cryptography component 255 may be configured to generate a signature of the server 204 to send with a data transmission. As part of generating the signature, the server cryptography component may calculate the hash of information, which may include a code for indicating that the message is a security-elevated command; the server nonce; the operating system update; a unique value (e.g., a monotonic value or device nonce) received from a device (e.g., the device 202). Additionally, to generate the signature, the server cryptography component 255 may sign the calculated hash with the private key of the server 204 to obtain the signature.

The server memory 245 may be configured to store information that is accessible via a data network. In some examples, the server memory 245 is used to store operating systems, operating system versions, operating system updates, or both.

Figure 3:
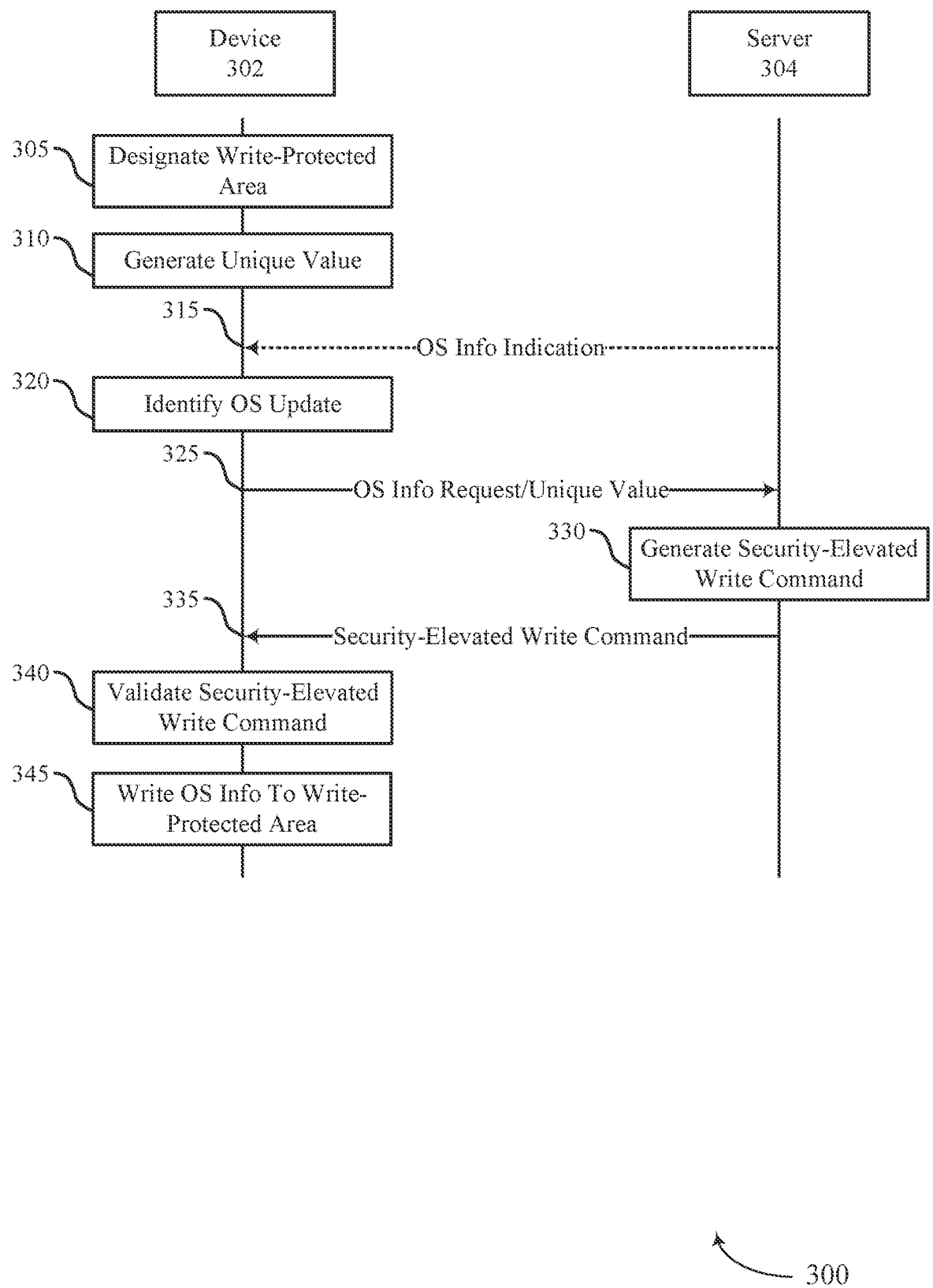
FIG. 3 illustrates an example of a set of operations that supports secure operating system update in accordance with examples as disclosed herein.

FIG. 3 illustrates an example of a set of operations for a secure operating system update in accordance with examples as disclosed herein.

Process flow 300 may be performed by device 302 and server 304, which may be respective examples of a device and a server described herein. In some examples, process flow 300 illustrates an example set of operations performed to support a secure operating system update. For example, process flow 300 may include operations for sending a unique value to a server so that the server may generate a security-elevated write command.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by controllers (e.g., a memory system controller and server controller described herein), may cause the controllers to perform the operations of the process flow 300.

One or more of the operations described in process flow 300 may be performed earlier or later, omitted, replaced, supplemented, or combined with another operation. Also, additional operations described herein may replace, supplement or be combined with one or more of the operations described in process flow 300.

At 305, a write-protected area of memory may be designated within the device 302. The write-protected area of memory may be configured so that standard write commands cannot be used to write to the write-protected area of memory (e.g., while the device 302 is in an operating mode). The write-protected area of memory may be further configured so that security-elevated write commands can be used to write to the write protected area of memory (e.g., while the device 302 is in the operating mode).

One or more operating systems used by device 302 may be stored in the write-protected area of memory. Additionally, a public key of the server 304 may be stored in the write-protected area of memory. The operating system, the public key of the server 304, or both may be stored in the write-protected area of memory prior to the deployment of the device 302.

At 310, a unique value may be generated (e.g., by the device 302). In some examples, the unique value may be unique in that the unique value may support a single security-elevated write command. That is, after the unique value is used to generate a security-elevated write command, a subsequent unique value may be generated.

In some examples, a monotonic counter within the device 302 may be used to generate the unique value. The monotonic counter may be configured to generate, in accordance with an increasing value pattern) a new unique value periodically, in response to an event, or a combination thereof. The event may be the expiration of a timer (e.g., a timer that is initialized with a random or recurring value), the reception of a security-elevated write command, or a combination thereof.

In other examples, a nonce generator within the device 302 may be used to generate the unique value. The nonce generator may be configured to generate a nonce periodically, in response to an event, or a combination thereof. The event may be the expiration of a timer (e.g., a timer that is initialized with a random or recurring value), the reception of a security-elevated write command, or a combination thereof. In some examples, the value selected for the nonce may be generated using a random number generator. The nonce generated by the device 302 may be referred to as a device-generated nonce or a $nonce_{dev}$.

At 315, an indication that operating system information (e.g., an operating system, a version of an operating system, an update to an operating system used by the device 302, etc.) is available may be received (e.g., at the device 302). The server 304 may transmit the indication that the operating system information to the device 302 based on a manufacturer of the operating system releasing the operating system information for consumption. In some examples, the indication that the operating system information is available may include a request for the unique value generated at the device 302.

At 320, the device 302 may identify that the operating system information is available. In some examples, the device 302 identifies the operating system information is available based on an indication received from the server 304. Additionally, or alternatively, the device 302 may identify the operating system information is available based on a user prompt or based on sending an inquiry of whether the operating system information is available.

At 325, a request for the operating system information may be transmitted from the device 302 to the server 304. The request for the operating system information may identify the particular operating system information being requested (e.g., the specific operating system, the specific operating system release, the specific operating system update). The request for the operating system information may also include the unique value generated at the device 302. In some examples, instead of including the unique value with the operating system information request, the device 302 separately sends the unique value in response to receiving, from the server 304, a request for the unique value—the server 304 may send the request for the unique value in response to receiving the operating system information request.

At 330, a security-elevated write command for writing the operating system information to the device 302 may be generated (E.g., by a server cryptographic component at the server 304). Cryptographic components at the server 304 may be used to generate the security-elevated write command. To generate the security-elevated write command and to obtain a server hash value ($h_{svr}$), the server 304 may calculate the hash of a combined set of data generated at the server 304. The combined set of data may include a command identification code used to identify the security-elevated write command (e.g., 0x12); the unique value received from the device 302; a nonce generated (e.g., randomly) by the server 304 (which may be referred to as a server-generated nonce); and the operating system information.

An equation for computing the server hash value may be represented as $h_{svr}$=hash(cmd_id||$value_{unq}$||$nonce_{svr}$||OS_Info), where the symbol || may represent a concatenation of data. If a monotonic counter at the device 302 is used to generate the unique value, then $value_{unq}$ may be replaced by the variable $cntr_{dev}$. If a nonce generator at the device 302 is used to generate the unique value, then $value_{unq}$ may be replaced by the variable $nonce_{dev}$.

After calculating the server hash value $h_{svr}$, the server 304 may sign the server hash value using a private key of the server 304 (that is paired with the public key of the server 304 stored at the device 302) to obtain a signature ($s_{svr}$). In some examples, the unique value may be a monotonic value generated at the device 302. In other examples, the unique value may be a nonce generated at the device 302.

At 335, the security-elevated write command may be transmitted to the device 302—e.g., after obtaining the signature. The security-elevated write command may include the command identification code, the unique value generated by the device, the server-generated nonce, the operating system information, and the signature. The transmission of the security-elevated write command may be represented as cmd_id||$value_{unq}$||$nonce_{svr}$||OS_Info||s. If a monotonic counter at the device 302 is used to generate the unique value, then $value_{unq}$ may be replaced by the variable counter. If a nonce generator at the device 302 is used to generate the unique value, then $value_{unq}$ may be replaced by the variable $nonce_{dev}$.

At 340, the security-elevated write command received from the server 304 may be validated (e.g., by a memory system controller of the device 202, a device cryptography component of the device 202, or both). Validating the security-elevated write command may include decoding, by the memory system controller, the cmd_id variable to determine that the command is a security-elevated write command. Based on determining that the command is a security-elevated write command, the memory system controller may decode the $value_{unq}$ variable to confirm that the security-elevated write command is not a replay (is "fresh").

Validating the security-elevated write command may further include calculating, by the device cryptography component, a hash of the received information to obtain a device hash value ($h_{dev}$). An equation for calculating the device hash value may be represented as $h_{dev}$=hash(cmd_id||$value_{unq}$||$nonce_{svr}$||OS_Info). After calculating the device hash value, the device 202 may use the public key of the server 304 to determine whether the device hash value matches the signature of the server 304. If the device hash value and the signature of the server 304 are mismatched, a write operation to the write-protected area of memory in device 302 may be prevented (e.g., by a memory system controller of the device 302). Additionally, or alternatively, if the unique value received in the security-elevated write command is mismatched with the unique value transmitted to the server 304, a write operation to the write-protected area of memory in device 302 may be prevented (e.g., by a memory system controller of the device 302). Otherwise, if the device hash value and the signature of the server 304 match and the transmitted and received unique values match, the write operation to the write-protected are of memory in device 302 may proceed.

At 345, the operating system information may be written (e.g., by the memory system controller of the device 302) to the write-protected area of memory—e.g., based on the security-elevated write command being validated.

Figure 4:
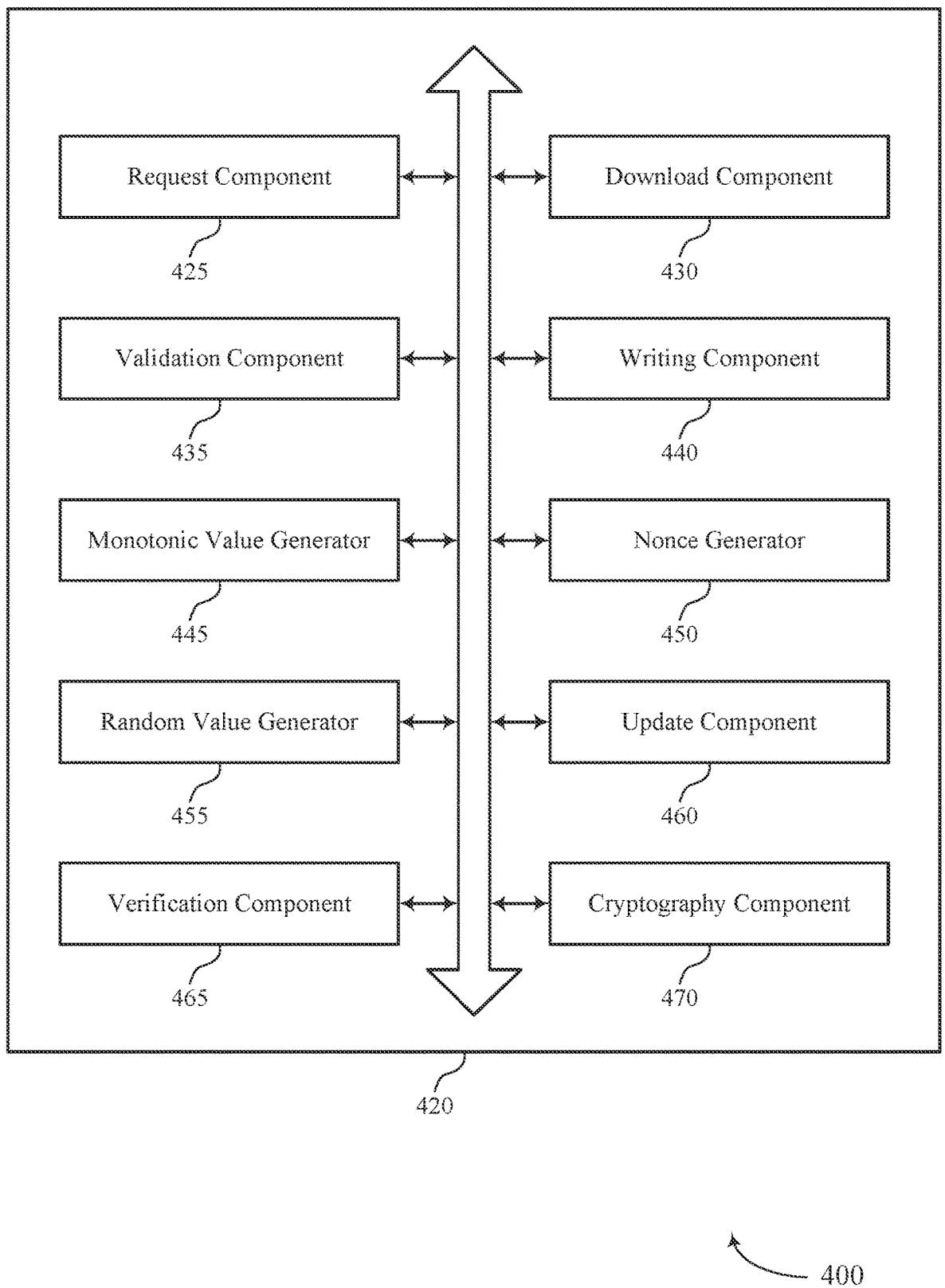
FIG. 4 shows a block diagram of a memory system that supports secure operating system update in accordance with examples as disclosed herein.

FIG. 4 shows a block diagram 400 of a memory system 420 that supports secure operating system update in accordance with examples as disclosed herein. The memory system 420 may be an example of aspects of a memory system as described with reference to FIGS. 1 through 3. The memory system 420, or various components thereof, may be an example of means for performing various aspects of secure operating system update as described herein. For example, the memory system 420 may include a request component 425, a download component 430, a validation component 435, a writing component 440, a monotonic value generator 445, a nonce generator 450, a random value generator 455, an update component 460, a verification component 465, a cryptography component 470, or any combination thereof. Each of these components may communicate, directly or indirectly, with one another (e.g., via one or more buses).

The request component 425 may be configured as or otherwise support a means for transmitting, to a server, a first message including a first value and a request associated with an operating system stored in a write-protected area of memory. The download component 430 may be configured as or otherwise support a means for receiving, in response to the first message, a second message including data associated with the operating system, a second value corresponding to the first value, and a signature of the server. The validation component 435 may be configured as or otherwise support a means for validating the data associated with the operating system based at least in part on the signature and the second value corresponding to the first value. The writing component 440 may be configured as or otherwise support a means for writing, based at least in part on validating the data associated with the operating system, the data to the operating system in the write-protected area.

In some examples, the monotonic value generator 445 may be configured as or otherwise support a means for generating a plurality of monotonic values, where the first value includes a monotonic value of the plurality of monotonic values generated prior to transmitting the first message to the server.

In some examples, the monotonic value is generated within a threshold duration of transmitting the first message to the server.

In some examples, generating the plurality of monotonic values includes triggering, based at least in part on receiving the second message, a monotonic counter to generate a second monotonic value of the plurality of monotonic values.

In some examples, the nonce generator 450 may be configured as or otherwise support a means for generating a nonce prior to transmitting the first message to the server, where the first value includes the nonce.

In some examples, generating the nonce includes triggering, based at least in part on receiving the second message, a nonce generator to output a second nonce.

In some examples, the random value generator 455 may be configured as or otherwise support a means for generating a plurality of random values, where the first value includes a random value of the plurality of random values generated within a threshold duration of transmitting the first message to the server.

In some examples, the update component 460 may be configured as or otherwise support a means for receiving, from the server, an indication that an update to the operating system is available for download, where the first message is transmitted based at least in part on the indication.

In some examples, the update component 460 may be configured as or otherwise support a means for receiving, from a user, an inquiry of whether an update to the operating system is available, where the first message is transmitted based at least in part on the inquiry.

In some examples, to support validating the data, the verification component 465 may be configured as or otherwise support a means for verifying an identity of the server based at least in part on authenticating the signature of the server. In some examples, to support validating the data, the verification component 465 may be configured as or otherwise support a means for determining that the second value corresponding to the first value and received in the second message matches the second value of the first value transmitted in the first message.

In some examples, the signature includes an encrypted version of the first value and the data associated with the operating system encrypted by a private key of the server and, to support authenticating the signature of the server, the cryptography component 470 may be configured as or otherwise support a means for decrypting, using a public key of the server, the signature to obtain a decrypted version of the signature. In some examples, the signature includes an encrypted version of the first value and the data associated with the operating system encrypted by a private key of the server and, to support authenticating the signature of the server, the verification component 465 may be configured as or otherwise support a means for comparing the decrypted version of the signature with the data associated with the operating system received in the second message, where the identity of the server is verified based at least in part on the decrypted version of the signature matching the data associated with the operating system received in the second message.

Figure 5:
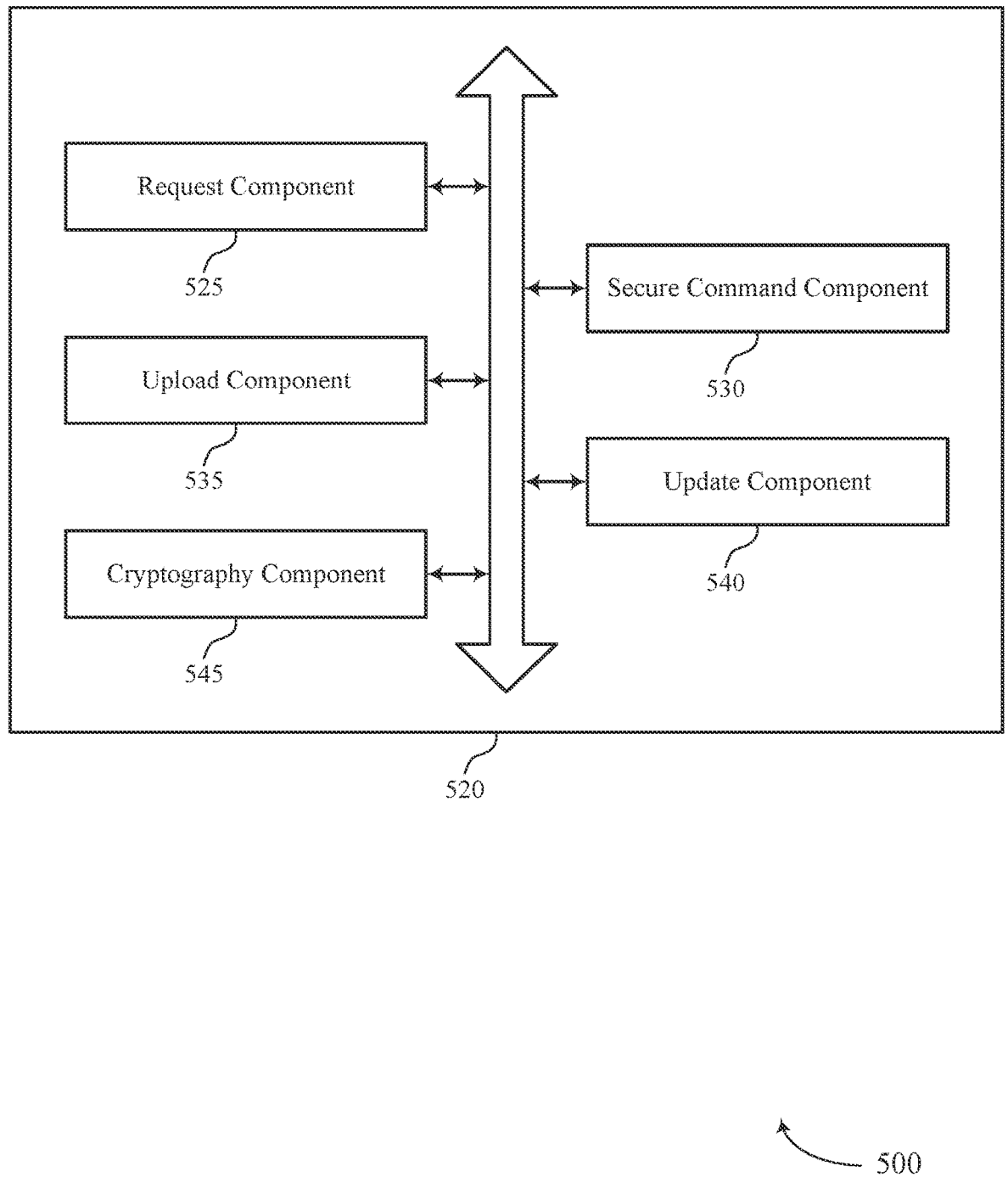
FIG. 5 shows a block diagram of a server that supports secure operating system update in accordance with examples as disclosed herein.

FIG. 5 shows a block diagram 500 of a server 520 that supports secure operating system update in accordance with examples as disclosed herein. The server 520 may be an example of aspects of a server as described with reference to FIGS. 1 through 3. The server 520, or various components thereof, may be an example of means for performing various aspects of secure operating system update as described herein. For example, the server 520 may include a request component 525, a secure command component 530, an upload component 535, an update component 540, a cryptography component 545, or any combination thereof. Each of these components may communicate, directly or indirectly, with one another (e.g., via one or more buses).

The request component 525 may be configured as or otherwise support a means for receiving, from a memory system, a first message including a first value and a request associated with an operating system of the memory system.

The secure command component 530 may be configured as or otherwise support a means for generating, in response to the first message, a second message including data associated with the operating system, the first value, and a signature, where the data is for writing to a write-protected area of the memory system. The upload component 535 may be configured as or otherwise support a means for transmitting, to the memory system, the second message based at least in part on the generating.

In some examples, the update component 540 may be configured as or otherwise support a means for transmitting, to the memory system, an indication that an update to the operating system is available for download, where the indication is transmitted prior to receiving the first message and the first message is received in response to the indication.

In some examples, the cryptography component 545 may be configured as or otherwise support a means for providing a public key to the memory system. In some examples, the cryptography component 545 may be configured as or otherwise support a means for storing a private key that is based at least in part on the public key, where the signature is generated based at least in part on the private key.

In some examples, the cryptography component 545 may be configured as or otherwise support a means for encrypting, using a private key, the first value and the data associated with the operating system to obtain the signature.

Figure 6:
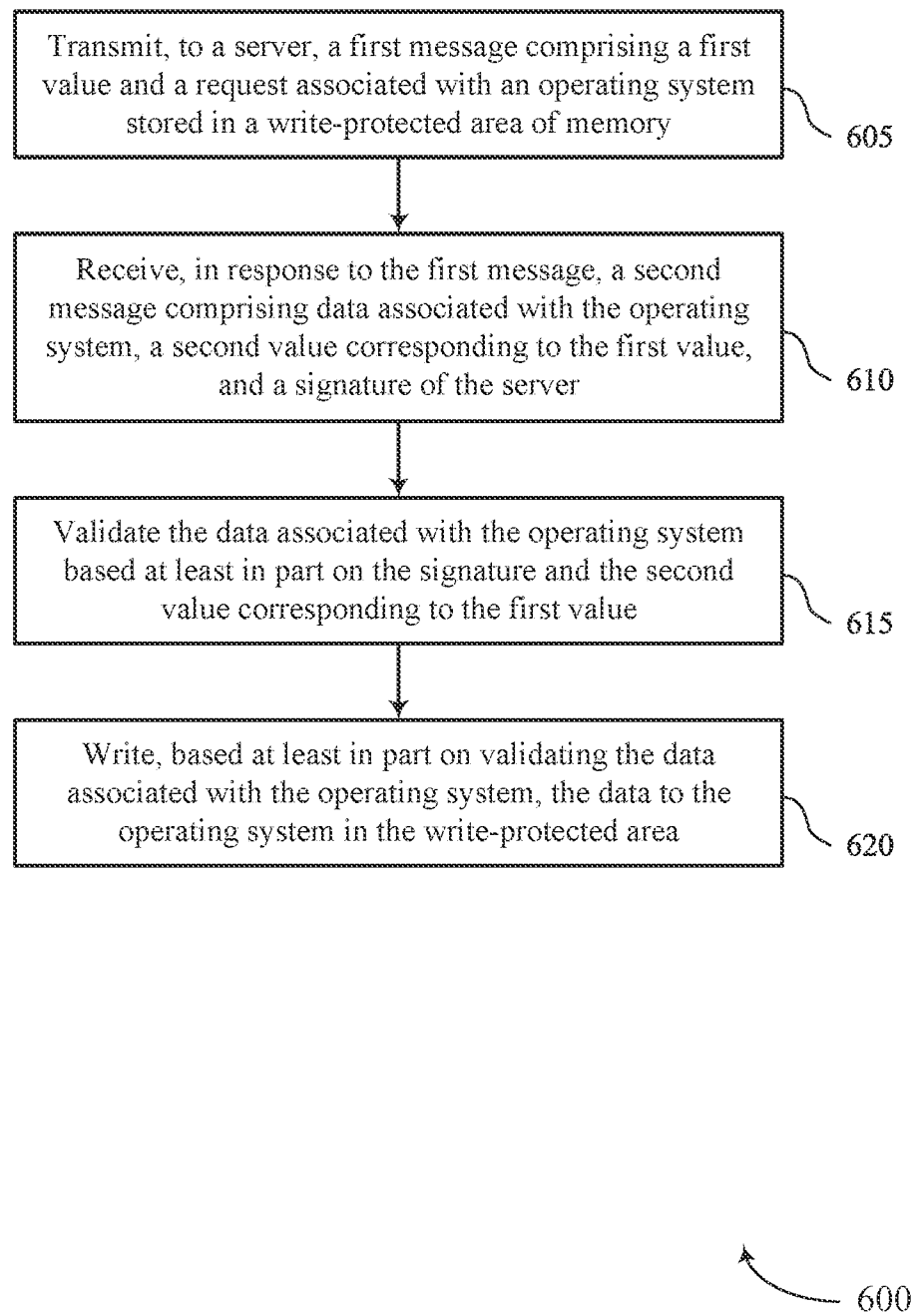
FIGS. 6 and 7 show flowcharts illustrating a method or methods that support secure operating system update in accordance with examples as disclosed herein.

FIG. 6 shows a flowchart illustrating a method 600 that supports secure operating system update in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include transmitting, to a server, a first message including a first value and a request associated with an operating system stored in a write-protected area of memory. The operations of 605 may be performed in accordance with examples as disclosed herein. In some examples, aspects of the operations of 605 may be performed by a request component 425 as described with reference to FIG. 4.

At 610, the method may include receiving, in response to the first message, a second message including data associated with the operating system, a second value corresponding to the first value, and a signature of the server. The operations of 610 may be performed in accordance with examples as disclosed herein. In some examples, aspects of the operations of 610 may be performed by a download component 430 as described with reference to FIG. 4.

At 615, the method may include validating the data associated with the operating system based at least in part on the signature and the second value corresponding to the first value. The operations of 615 may be performed in accordance with examples as disclosed herein. In some examples, aspects of the operations of 615 may be performed by a validation component 435 as described with reference to FIG. 4.

At 620, the method may include writing, based at least in part on validating the data associated with the operating system, the data to the operating system in the write-protected area. The operations of 620 may be performed in accordance with examples as disclosed herein. In some examples, aspects of the operations of 620 may be performed by a writing component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting, to a server, a first message including a first value and a request associated with an operating system stored in a write-protected area of memory; receiving, in response to the first message, a second message including data associated with the operating system, a second value corresponding to the first value, and a signature of the server; validating the data associated with the operating system based at least in part on the signature and the second value corresponding to the first value; and writing, based at least in part on validating the data associated with the operating system, the data to the operating system in the write-protected area.

Aspect 2: The method, apparatus, or non-transitory computer-readable medium of aspect 1, further including operations, features, circuitry, logic, means, or instructions, or any combination thereof for generating a plurality of monotonic values, where the first value includes a monotonic value of the plurality of monotonic values generated prior to transmitting the first message to the server.

Aspect 3: The method, apparatus, or non-transitory computer-readable medium of aspect 2 where the monotonic value is generated within a threshold duration of transmitting the first message to the server.

Aspect 4: The method, apparatus, or non-transitory computer-readable medium of any of aspects 2 through 3 where generating the plurality of monotonic values includes triggering, based at least in part on receiving the second message, a monotonic counter to generate a second monotonic value of the plurality of monotonic values.

Aspect 5: The method, apparatus, or non-transitory computer-readable medium of any of aspects 1 through 4, further including operations, features, circuitry, logic, means, or instructions, or any combination thereof for generating a nonce prior to transmitting the first message to the server, where the first value includes the nonce.

Aspect 6: The method, apparatus, or non-transitory computer-readable medium of aspect 5 where generating the nonce includes triggering, based at least in part on receiving the second message, a nonce generator to output a second nonce.

Aspect 7: The method, apparatus, or non-transitory computer-readable medium of any of aspects 1 through 6, further including operations, features, circuitry, logic, means, or instructions, or any combination thereof for generating a plurality of random values, where the first value includes a random value of the plurality of random values generated within a threshold duration of transmitting the first message to the server.

Aspect 8: The method, apparatus, or non-transitory computer-readable medium of any of aspects 1 through 7, further including operations, features, circuitry, logic, means, or instructions, or any combination thereof for receiving, from the server, an indication that an update to the operating system is available for download, where the first message is transmitted based at least in part on the indication.

Aspect 9: The method, apparatus, or non-transitory computer-readable medium of any of aspects 1 through 8, further including operations, features, circuitry, logic, means, or instructions, or any combination thereof for receiving, from a user, an inquiry of whether an update to the operating system is available, where the first message is transmitted based at least in part on the inquiry.

Aspect 10: The method, apparatus, or non-transitory computer-readable medium of any of aspects 1 through 9 where validating the data includes operations, features, circuitry, logic, means, or instructions, or any combination thereof for verifying an identity of the server based at least in part on authenticating the signature of the server and determining that the second value corresponding to the first value and received in the second message matches the second value of the first value transmitted in the first message.

Aspect 11: The method, apparatus, or non-transitory computer-readable medium of aspect 10 where the signature includes an encrypted version of the first value and the data associated with the operating system encrypted by a private key of the server, and authenticating the signature of the server includes operations, features, circuitry, logic, means, or instructions, or any combination thereof for decrypting, using a public key of the server, the signature to obtain a decrypted version of the signature and comparing the decrypted version of the signature with the data associated with the operating system received in the second message, where the identity of the server is verified based at least in part on the decrypted version of the signature matching the data associated with the operating system received in the second message.

Figure 7:
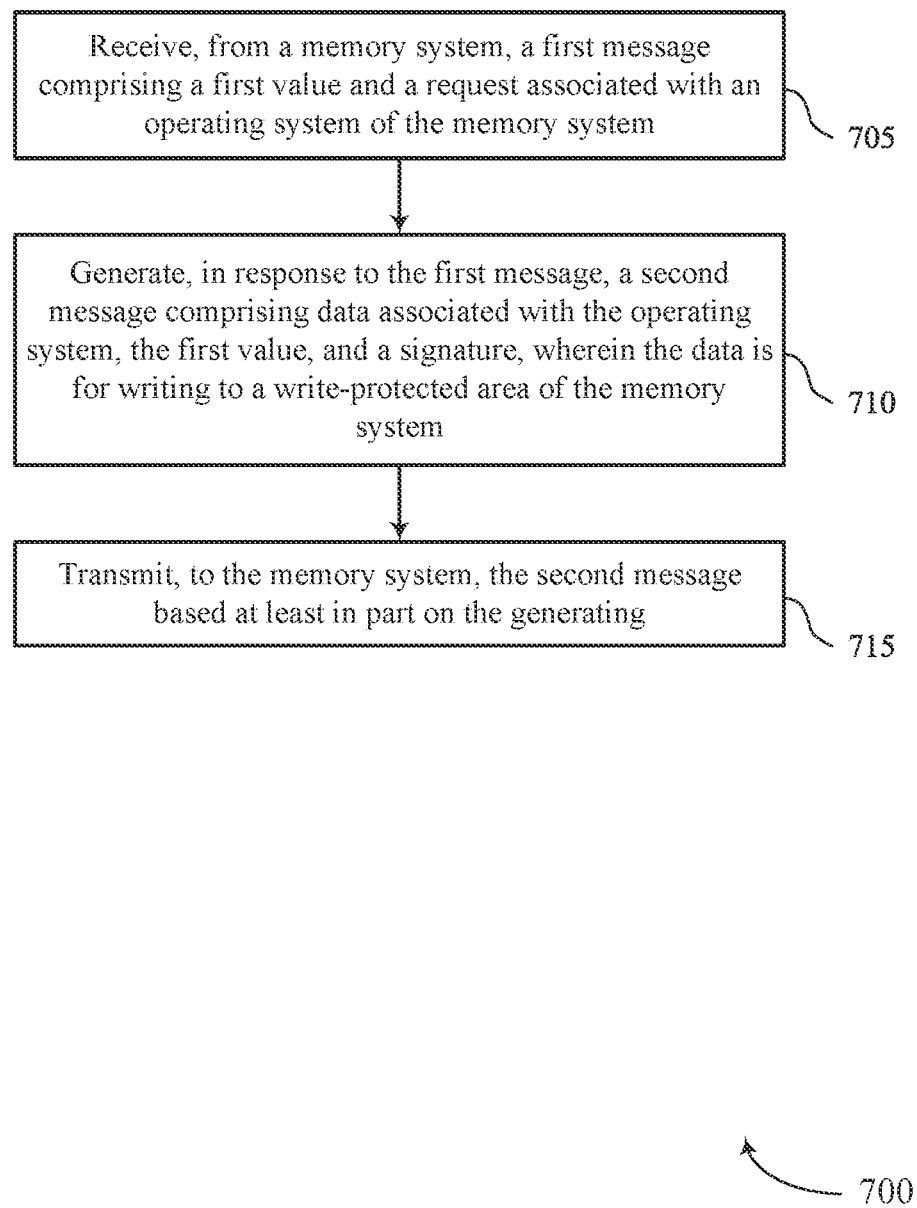

FIG. 7 shows a flowchart illustrating a method 700 that supports secure operating system update in accordance with examples as disclosed herein. The operations of method 700 may be implemented by a server or its components as described herein. For example, the operations of method 700 may be performed by a server as described with reference to FIGS. 1 through 3 and 5. In some examples, a server may execute a set of instructions to control the functional elements of the device to perform the described functions. Additionally, or alternatively, the server may perform aspects of the described functions using special-purpose hardware.

At 705, the method may include receiving, from a memory system, a first message including a first value and a request associated with an operating system of the memory system. The operations of 705 may be performed in accordance with examples as disclosed herein. In some examples, aspects of the operations of 705 may be performed by a request component 525 as described with reference to FIG. 5.

At 710, the method may include generating, in response to the first message, a second message including data associated with the operating system, the first value, and a signature, where the data is for writing to a write-protected area of the memory system. The operations of 710 may be performed in accordance with examples as disclosed herein. In some examples, aspects of the operations of 710 may be performed by a secure command component 530 as described with reference to FIG. 5.

At 715, the method may include transmitting, to the memory system, the second message based at least in part on the generating. The operations of 715 may be performed in accordance with examples as disclosed herein. In some examples, aspects of the operations of 715 may be performed by an upload component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for receiving, from a memory system, a first message including a first value and a request associated with an operating system of the memory system; generating, in response to the first message, a second message including data associated with the operating system, the first value, and a signature, where the data is for writing to a write-protected area of the memory system; and transmitting, to the memory system, the second message based at least in part on the generating.

Aspect 13: The method, apparatus, or non-transitory computer-readable medium of aspect 12, further including operations, features, circuitry, logic, means, or instructions, or any combination thereof for transmitting, to the memory system, an indication that an update to the operating system is available for download, where the indication is transmitted prior to receiving the first message and the first message is received in response to the indication.

Aspect 14: The method, apparatus, or non-transitory computer-readable medium of any of aspects 12 through 13, further including operations, features, circuitry, logic, means, or instructions, or any combination thereof for providing a public key to the memory system and storing a private key that is based at least in part on the public key, where the signature is generated based at least in part on the private key.

Aspect 15: The method, apparatus, or non-transitory computer-readable medium of any of aspects 12 through 14, further including operations, features, circuitry, logic, means, or instructions, or any combination thereof for encrypting, using a private key, the first value and the data associated with the operating system to obtain the signature.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 16: An apparatus, including: a memory device; and a controller coupled with the memory device and configured to cause the apparatus to: transmit, to a server, a first message including a first value and a request associated with an operating system stored in a write-protected area of memory; receive, in response to the first message, a second message including data associated with the operating system, a second value corresponding to the first value, and a signature of the server; validate the data associated with the operating system based at least in part on the signature and the second value corresponding to the first value; and write, based at least in part on validating the data associated with the operating system, the data to the operating system in the write-protected area.

Aspect 17: The apparatus of aspect 16, where the controller is further configured to cause the apparatus to:

generate a plurality of monotonic values, where the first value includes a monotonic value of the plurality of monotonic values generated within a threshold duration of transmitting the first message to the server.

Aspect 18: The apparatus of any of aspects 16 through 17, where the controller is further configured to cause the apparatus to: generate a plurality of random values, where the first value includes a random value of the plurality of random values generated within a threshold duration of transmitting the first message to the server.

Aspect 19: The apparatus of any of aspects 16 through 18, where the controller is further configured to cause the apparatus to; receive, from the server, an indication that an update to the operating system is available for download, where the first message is transmitted based at least in part on the indication.

Aspect 20: The apparatus of any of aspects 16 through 19, where the controller is further configured to cause the apparatus to: receive, from a user, an inquiry of whether an update to the operating system is available, where the first message is transmitted based at least in part on the inquiry.

Aspect 21: The apparatus of any of aspects 16 through 20, where, to validate the data, the controller is further configured to cause the apparatus to: verify an identity of the server based at least in part on authenticating the signature of the server; and determine that the second value corresponding to the first value and received in the second message matches the second value of the first value transmitted in the first message.

An apparatus is described. The following provides an overview of aspects of the apparatus as described herein:

Aspect 22: A apparatus, including: a controller coupled configured to cause the apparatus to: receive, from a memory system, a first message including a first value and a request associated with an operating system of the memory system; generate, in response to the first message, a second message including data associated with the operating system, the first value, and a signature, where the data is to be written to a write-protected area of the memory system; and transmit, to the memory system, the second message based at least in part on the generating.

Aspect 23: The apparatus of aspect 22, where the controller is further configured to cause the apparatus to: transmit, to the memory system, an indication that an update to the operating system is available for download, where the indication is transmitted prior to receiving the first message and the first message is received in response to the indication.

Aspect 24: The apparatus of any of aspects 22 through 23, where the controller is further configured to cause the apparatus to: provide a public key to the memory system; and store a private key that is based at least in part on the public key, where the signature is generated based at least in part on the private key.

Aspect 25: The apparatus of any of aspects 22 through 24, where the controller is further configured to cause the apparatus to: encrypt, using a private key, the first value and the data associated with the operating system to obtain the signature.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
generating a plurality of monotonic values;
generating a first unique value, wherein the first unique value comprises a monotonic value of the plurality of monotonic values;
transmitting, to a server, a first message comprising a first value and a request associated with an operating system stored in a write-protected area of memory, wherein the first value comprises the first unique value that comprises the monotonic value of the plurality of monotonic values generated prior to transmitting the first message to the server;
receiving, in response to the first message, a second message comprising data associated with the operating system, a second value corresponding to the first value, and a signature of the server;
triggering, based at least in part on receiving the second message, a monotonic counter to generate a second unique value that comprises a second monotonic value of the plurality of monotonic values;
validating the data associated with the operating system based at least in part on the signature and the second value corresponding to the first value; and
writing, based at least in part on validating the data associated with the operating system, the data to the operating system in the write-protected area.

2. The method of claim 1, wherein the monotonic value is generated within a threshold duration of transmitting the first message to the server.

3. The method of claim 1, further comprising:
generating a plurality of random values, wherein a third value comprises a random value of the plurality of random values generated within a threshold duration of transmitting a third message to the server comprising the third value.

4. The method of claim 1, further comprising:
receiving, from the server, an indication that an update to the operating system is available for download, wherein the first message is transmitted based at least in part on the indication.

5. The method of claim 1, further comprising:
receiving, from a user, an inquiry of whether an update to the operating system is available, wherein the first message is transmitted based at least in part on the inquiry.

6. The method of claim 1, wherein validating the data comprises:
verifying an identity of the server based at least in part on authenticating the signature of the server; and
determining that the second value corresponding to the first value and received in the second message matches the second value of the first value transmitted in the first message.

7. The method of claim 6, wherein:
the signature comprises an encrypted version of the first value and the data associated with the operating system encrypted by a private key of the server, and
authenticating the signature of the server comprises:
decrypting, using a public key of the server, the signature to obtain a decrypted version of the signature; and
comparing the decrypted version of the signature with the data associated with the operating system received in the second message, wherein the identity of the server is verified based at least in part on the decrypted version of the signature matching the data associated with the operating system received in the second message.

8. A method, comprising:
generating a first unique value, wherein generating the first unique value comprises generating a nonce;
transmitting, to a server after generating the first unique value, a first message comprising a first value and a request associated with an operating system stored in a write-protected area of memory, wherein the first value comprises the first unique value that comprises the nonce;
receiving, in response to the first message, a second message comprising data associated with the operating system, a second value corresponding to the first value, and a signature of the server;
triggering, based at least in part on receiving the second message, generation of a second unique value that comprises a second nonce, wherein the triggering comprises triggering a nonce generator to output the second nonce;
validating the data associated with the operating system based at least in part on the signature and the second value corresponding to the first value; and
writing, based at least in part on validating the data associated with the operating system, the data to the operating system in the write-protected area.

9. The method of claim 8, further comprising:
generating a plurality of random values, wherein a third value comprises a random value of the plurality of random values generated within a threshold duration of transmitting a third message to the server comprising the third value.

10. The method of claim 8, further comprising:
receiving, from the server, an indication that an update to the operating system is available for download, wherein the first message is transmitted based at least in part on the indication.

11. The method of claim 8, further comprising:
receiving, from a user, an inquiry of whether an update to the operating system is available, wherein the first message is transmitted based at least in part on the inquiry.

12. The method of claim 8, wherein validating the data comprises:
verifying an identity of the server based at least in part on authenticating the signature of the server; and
determining that the second value corresponding to the first value and received in the second message matches the second value of the first value transmitted in the first message.

13. The method of claim 12, wherein:
the signature comprises an encrypted version of the first value and the data associated with the operating system encrypted by a private key of the server, and
authenticating the signature of the server comprises:
   decrypting, using a public key of the server, the signature to obtain a decrypted version of the signature; and
   comparing the decrypted version of the signature with the data associated with the operating system received in the second message, wherein the identity of the server is verified based at least in part on the decrypted version of the signature matching the data associated with the operating system received in the second message.

14. An apparatus, comprising:
a memory device; and
a controller coupled with the memory device and configured to cause the apparatus to:
   generate a plurality of monotonic values;
   generate a first unique value, wherein the first unique value comprises a monotonic value of the plurality of monotonic values;
   transmit, to a server, a first message comprising a first value and a request associated with an operating system stored in a write-protected area of memory, wherein the first value comprises the first unique value that comprises the monotonic value of the plurality of monotonic values generated prior to transmitting the first message to the server;
   receive, in response to the first message, a second message comprising data associated with the operating system, a second value corresponding to the first value, and a signature of the server;
   trigger, based at least in part on receiving the second message, a monotonic counter to generate a second unique value that comprises a second monotonic value of the plurality of monotonic values;
   validate the data associated with the operating system based at least in part on the signature and the second value corresponding to the first value; and
   write, based at least in part on validating the data associated with the operating system, the data to the operating system in the write-protected area.

15. The apparatus of claim 14, wherein
the monotonic value of the plurality of monotonic values is generated within a threshold duration of transmitting the first message to the server.

16. The apparatus of claim 14, wherein the controller is further configured to cause the apparatus to:
   generate a plurality of random values, wherein a third value comprises a random value of the plurality of random values generated within a threshold duration of transmitting a third message to the server comprising the third value.

17. The apparatus of claim 14, wherein the controller is further configured to cause the apparatus to:
   receive, from the server, an indication that an update to the operating system is available for download, wherein the first message is transmitted based at least in part on the indication.

18. The apparatus of claim 14, wherein the controller is further configured to cause the apparatus to:
   receive, from a user, an inquiry of whether an update to the operating system is available, wherein the first message is transmitted based at least in part on the inquiry.

19. The apparatus of claim 14, wherein, to validate the data, the controller is further configured to cause the apparatus to:
   verify an identity of the server based at least in part on authenticating the signature of the server; and
   determine that the second value corresponding to the first value and received in the second message matches the second value of the first value transmitted in the first message.

20. The apparatus of claim 19, wherein:
the signature comprises an encrypted version of the first value and the data associated with the operating system encrypted by a private key of the server, and
authenticating the signature of the server comprises:
   decrypting, using a public key of the server, the signature to obtain a decrypted version of the signature; and
   comparing the decrypted version of the signature with the data associated with the operating system received in the second message, wherein the identity of the server is verified based at least in part on the decrypted version of the signature matching the data associated with the operating system received in the second message.

21. An apparatus, comprising:
a memory device; and
a controller coupled with the memory device and configured to cause the apparatus to:
   generate a first unique value, wherein generating the first unique value comprises generating a nonce;
   transmit, to a server after generating the first unique value, a first message comprising a first value and a request associated with an operating system stored in a write-protected area of memory, wherein the first value comprises the first unique value that comprises the nonce;
   receive, in response to the first message, a second message comprising data associated with the operating system, a second value corresponding to the first value, and a signature of the server;
   trigger, based at least in part on receiving the second message, generation of a second unique value that comprises a second nonce, wherein the triggering comprises triggering a nonce generator to output the second nonce;
   validate the data associated with the operating system based at least in part on the signature and the second value corresponding to the first value; and
   write, based at least in part on validating the data associated with the operating system, the data to the operating system in the write-protected area.

22. The apparatus of claim 21, wherein the controller is further configured to cause the apparatus to:
   generate a plurality of random values, wherein a third value comprises a random value of the plurality of random values generated within a threshold duration of transmitting a third message to the server comprising the third value.

23. The apparatus of claim 21, wherein the controller is further configured to cause the apparatus to:
   receive, from the server, an indication that an update to the operating system is available for download, wherein the first message is transmitted based at least in part on the indication.

24. The apparatus of claim 21, wherein the controller is further configured to cause the apparatus to:

receive, from a user, an inquiry of whether an update to the operating system is available, wherein the first message is transmitted based at least in part on the inquiry.

25. The apparatus of claim 21, wherein, to validate the data, the controller is further configured to cause the apparatus to:

verify an identity of the server based at least in part on authenticating the signature of the server; and determine that the second value corresponding to the first value and received in the second message matches the second value of the first value transmitted in the first message.

* * * * *